July 21, 1953  E. A. RUSSELL ET AL  2,646,028
STANDBY HOT WATER HEATER FOR BUSES
Filed Sept. 29, 1950  4 Sheets-Sheet 1

INVENTORS.
Edward A. Russell
Norman O. Kirkby
BY
Harvey M. Gillespie
Atty.

July 21, 1953     E. A. RUSSELL ET AL     2,646,028
STANDBY HOT WATER HEATER FOR BUSES
Filed Sept. 29, 1950     4 Sheets-Sheet 3
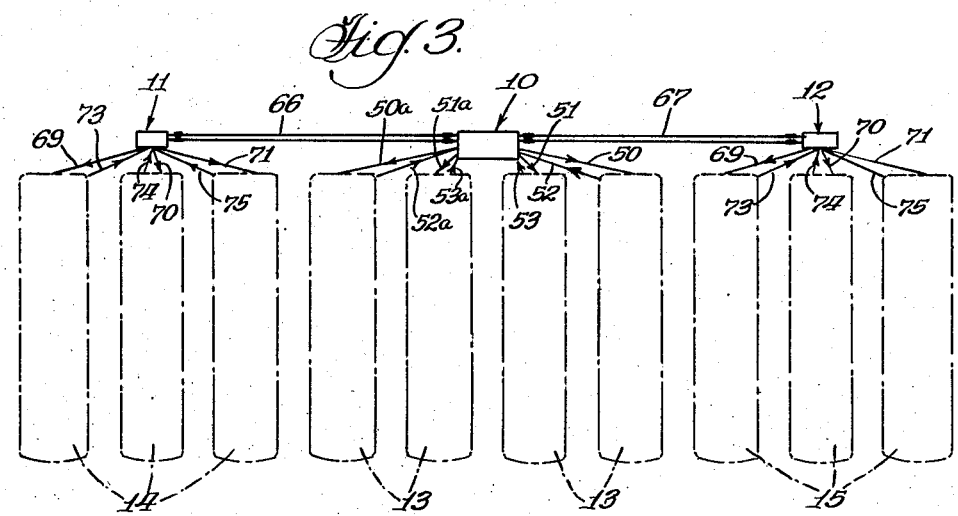
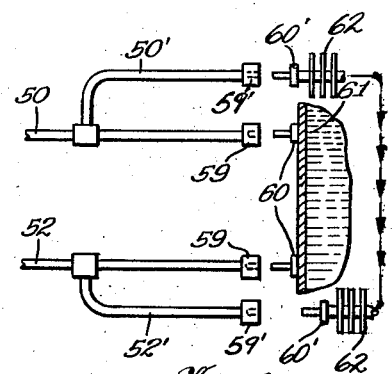
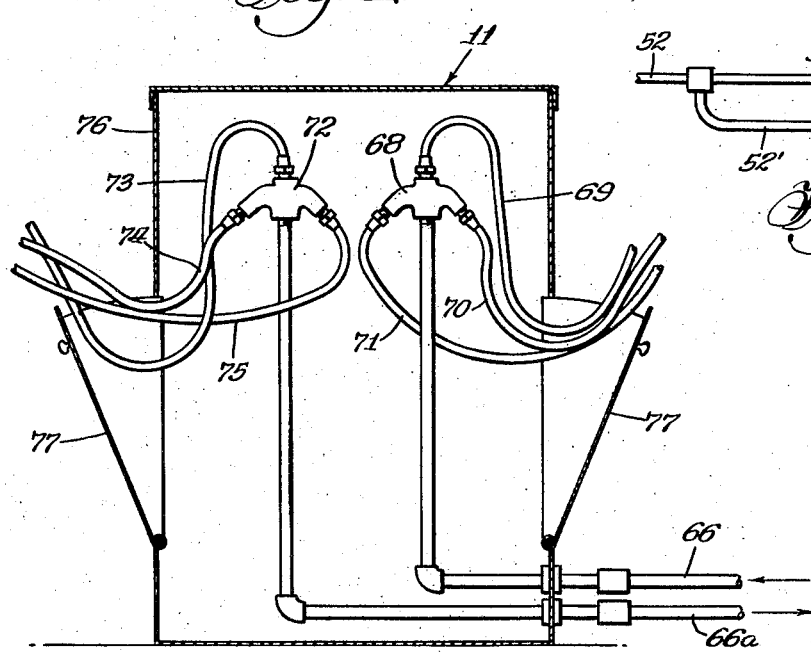
INVENTORS.
Edward A. Russell
Norman O. Kirkby
BY
Harvey M. Gillespie Atty.

Patented July 21, 1953

2,646,028

UNITED STATES PATENT OFFICE 2,646,028

STANDBY HOT WATER HEATER FOR BUSES

Edward A. Russell, Chicago, and Norman O. Kirkby, Elmhurst, Ill., assignors to Vapor Heating Corporation, Chicago, Ill., a corporation of Delaware Application September 29, 1950, Serial No. 187,391

15 Claims. (Cl. 123—142.5)

This invention relates to heating apparatus for supplying hot water, at control temperatures, to the engine blocks and/or interior heating equipment of buses and other motor vehicles while they are temporarily out of service, during cold weather, and stationed in a parking lot.

One object of the invention is to provide an improved arrangement of means for supplying hot water at a proper temperature to the water jackets of engines of a plurality of buses, or the like, and to the heating systems thereof so as to maintain such vehicles, when temporarily stationed in a parking lot, ready for immediate service.

Another object is to provide an apparatus for the above purpose in which the heating capacity may be readily varied to accommodate the heating requirements of various numbers of vehicles which may be connected therewith. In this connection the invention contemplates the provision of a heating system composed of a central heating plant and a number of stations, each station being adapted to serve one or more of a group of vehicles.

Another object is to provide a heating system of the above character which will automatically start operations when the temperature at the parking lot is such as to require the delivery of heat to the buses stationed in said lot and which will automatically cease operation when the temperature rises above a predetermined point.

A further object is to provide automatic controls for the central heating plant so as to maintain the water supplied within the upper and lower limits of a predetermined temperature range regardless of the number of vehicles being served. In this connection the invention includes control means which is effective when the water reaches a predetermined maximum temperature, to shut off the fuel supply to the heating plant and to again start operations of the heating plant when the temperature of the water cools to the lower limit of said predetermined temperature range. The said automatic control also includes the provision of an alarm which becomes effective when the temperature in the return line to the heating plant reaches a predetermined temperature.

Other objects and advantages of the invention will appear from the following description of the apparatus as illustrated in the accompanying drawings, in which:

Fig. 3 is a schematic plan view of a parking lot equipped with a heating apparatus of the present invention for supplying hot water to several stations, each station serving one or more parked buses or other vehicles.

Fig. 4 is a vertical sectional view of one distributing station of the apparatus. The station being illustrated is the one appearing at the left of Fig. 3.

Fig. 5 is a diagrammatic view showing the arrangement of the connections between the hot water supply lines leading from the improved heating means and the water circulating system employed in a bus for cooling its engine and/or for heating the interior of the bus.

Figure 1:
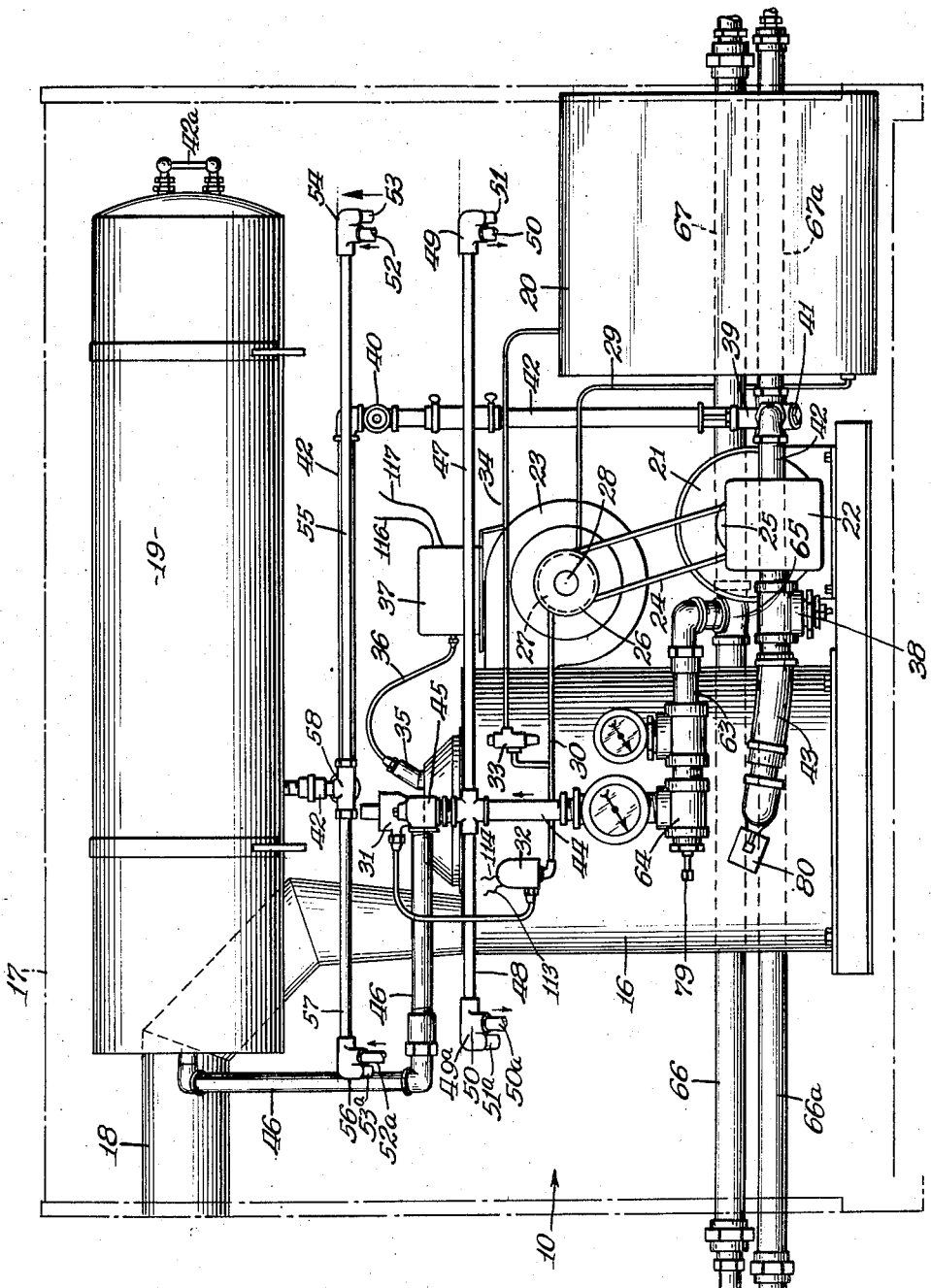
Fig. 1 is a side face view of a water heating unit and the various connections leading from the water heater to a plurality of stations for serving one or more buses or other vehicles.
Figure 2:
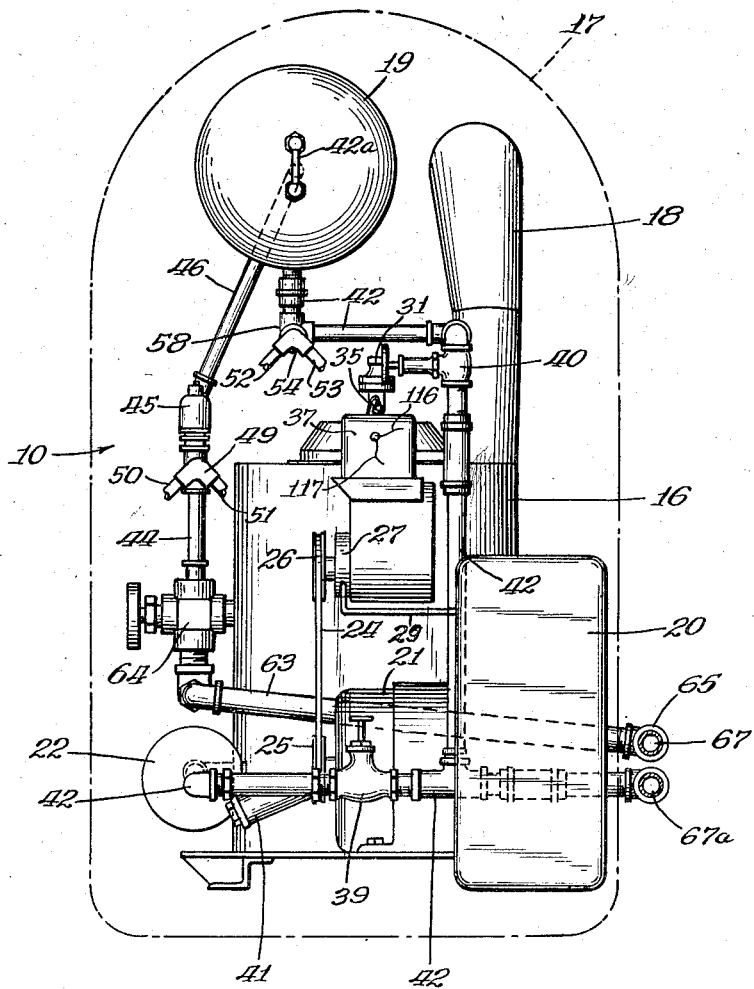
Fig. 2 is an end view of the unit as seen from the right of Fig. 1.

Referring now to the several figures of the drawing: 10 indicates an operative water heating unit, with auxiliary distributing stations or units 11 and 12 connected therewith. The unit 10 constitutes a distributing station for four buses, designated 13, which are operatively connected therewith. The station 11 is illustrated as serving three buses, designated 14, and the station 12 is illustrated as serving three buses, designated 15.

The unit 10 is illustrated in Fig. 1 as comprising a hot water boiler 16, of the water tube type, and associated apparatus contained in a housing 17. The heating plant is provided with a smoke stack 18 extending upwardly from the boiler and opening outside of the housing. Above the boiler 16, there is a water tank 19 for containing a supply of water and serving also to receive a quantity of water which may be delivered from the boiler into the supply tank and returned therefrom direct to the suction side of a circulating pump 22. A fuel tank 20 is positioned adjacent the boiler, preferably within the housing 17. An electric motor 21 is operatively connected to a water circulating pump 22 of any approved type. The said motor 21 is also connected to a blower 23, by means of a belt 24 and cooperating driving pulleys 25 and 26, the blower being adapted to deliver combustion air into the fire chamber of the boiler.

A fuel pump 27, of any approved construction, is operatively connected to the blower shaft 28. The said pump 27 withdraws oil from the tank 20 through a pipe 29 and delivers said oil through a pipe 30 to a spray nozzle structure 31. The spray nozzle structure 31 extends into the combustion chamber of the boiler so as to spray the oil, in known manner, into the combustion air. The delivery of oil to the spray nozzle 31 is controlled by a de-energized open solenoid valve 32 connected in the oil delivery pipe 30. When the valve 32 is energized closed, the oil from pump 27 is passed through a pressure opened relief valve 33 and is returned to the supply tank 20 through pipe 34. However, when oil is being delivered into the fire chamber of the boiler, it is ignited by means of an electric spark produced by high-tension current passed through a spark plug 35 from a cable 36 connected to a transformer 37. The transformer receives its energizing current from the leads 116—117 of the electrical control circuits hereinafter described.

The boiler and circulating pipes may be filled with water by connecting the fitting 38 to a suitable source of water supply and opening the valves 39 and 40 so that the water will completely fill the entire circulating system. Make-up water, to replenish any of the water drawn from the system to fill the engine cooling systems of the buses, may be supplied from time to time during the operation of the boiler by connecting the fitting 41 to said water supply source until the sight gauge 42ª indicates a suitable level of water in the tank 19.

During the initial heat-up of the water, the pump 22 withdraws water from the tank 19 through piping 42 and opens valves 39 and 40 to the inlet side of the pump 22. The pump then forces the water through conduit connection 43 into the boiler 16. The water discharged from the boiler 16 passes through a delivery pipe 44, pressure relief valve 45 and piping 46 into the receiving end of the water tank 19.

The unit 10, as previously indicated, serves as one distributing station and is adapted to supply hot water to the liquid coolant systems of the engines of four buses 13, as shown in Fig. 3. In order to accomplish this result, hot water delivery headers 47 and 48 are connected into the said delivery pipe 44 intermediate the boiler outlet and the relief valve 45 so that a portion of the water discharged from the boiler 16 will be delivered under pressure to the said delivery headers. The header 47 is provided at its outer end with a two-way fitting 49 for attachment to a pair of hoses 50, 51 leading to two of the buses 13. The outer end of header 48 is provided with a similar two-way fitting 49ª for attachment to a pair of hoses 50ª, 51ª leading to a second pair of buses 13. A pair of return hoses 52, 53 lead from one pair of buses 13 to a two-way fitting 54 at one end of the return header 55. A similar pair of return hoses 52ª, 53ª lead from the second pair of buses 13 to a two-way fitting 56 at the end of return header 57. The return headers 55 and 57 are connected into a four-way fitting 58 forming a part of the line of piping 42 leading from the water tank 19 to the inlet side of pump 22. It will be observed, therefore, that hot water will be delivered through the headers 47, 48 and hoses 50, 51 and 50ª, 51ª to the several buses 13 and that water will be returned from the buses to the boiler through hoses 52, 53 and 52ª, 53ª and return headers 55 and 57 and the piping 42 leading to the pump 22.

The coupling elements for connecting the hoses to the water jacket of the engine of a bus may be of known form and the specific location for connecting the said hoses may be varied to accommodate the form of bus engine and the construction of the bus heating system. However, for the purpose of illustration, one delivery hose and one return hose and its connections to a bus are illustrated in Fig. 5. In this figure the delivery hose 50 is illustrated as provided with a branch 50'. The main hose is provided with a self-closer coupler 59 adapted to be engaged with a mating coupler 60 fitted in an inlet port to the water jacket 61 of a bus engine. The branch hose 50' is provided with a similar coupling 59' for engagement with a mating coupler 60' connected in the inlet end of a radiator 62 located within the bus. The return hose 52 is provided with a branch 52' and both of these hoses are provided with self-sealing couplers similar to the couplers 59—59' for connecting the main and branch hoses, respectively, from the outlets of the water jackets 61 and from the radiator 62.

Referring now to the distributing stations 11 and 12: Both stations are supplied with hot water by means of a delivery branch pipe 63 which leads from an outlet fitting 64 forming a part of the delivery piping 44. The delivery branch 63 connects, by means of a T-fitting 65, into branches 66 leading to station 11 and 67 leading to station 12. Return pipes 66ª and 67ª lead, respectively, from the stations 11 and 12 to the piping 42 and thence connect through said piping 42 with the receiving side of the pump 22.

Both distributing stations 11 and 12 may be of identical construction. It will be necessary, therefore, to describe only station 11. This station, as previously indicated, serves three buses. Consequently, the delivery branch pipe 66 is provided with a three-way outlet fitting 68. Hot water hoses 69, 70 and 71 lead from the fitting 68 to the several busses designated 14. These hoses are provided with mating couplers for connecting with the engines and heating systems, respectively, of each bus substantially as shown and described in connection with Fig. 5. The return pipe 67ª is provided with a similar three-way fitting 72 provided with return hoses 73, 74 and 75 which are preferably provided with couplings for connecting with outlet ports from the water jacket of the engine and from the radiator substantially as illustrtaed in Fig. 5 so that hot water is supplied to each of the buses designated 14 in Fig. 3 and a corresponding amount of water is returned from the buses to the boiler. Each station 11 and 12 is enclosed in a housing 76 provided with trap doors 77 through which the hoses may be withdrawn from the housing.

By virtue of the fact that each of the several distributing stations is constructed to serve a plurality of buses, it is possible that less than the maximum number may be served. The hot water heating and circulating system is provided with a capacity sufficient to supply hot water to a maximum number of buses. However, when less than the maximum number of buses are being served a portion of the heated water is circulated through the water tank 19 and returned to the inlet side of the pump 22, the pressure, in such cases, being sufficient to open the relief valve 45 to permit the water to flow into the tank 19.

In the use of the improved heating apparatus, the operation of the boiler 16 is controlled automatically with relation to the outside temperature and also with relation to the temperature of the water circulated through the system. The thermostat 78 is positioned to respond to the temperature existing at the parking lot, the thermostat being set to function at a predetermined temperature, for example 50° F. This thermostat is effective to control the circulation of water through the boiler, that is to say, when the temperature falls below the temperature setting of said thermostat, for example 50° F., the boiler will be set into operation, assuming that the main switch E is closed.

A thermostatically controlled aquastat 79 is inserted in the fitting 64 of the hot water delivery line so as to respond to the temperature of the water delivered from the boiler. This aquastat has a high temperature setting of 150° F. and a low temperature setting of 125°. Its function in the control circuits is to bring about interruption of the firing boiler when the temperature of the delivery water reaches a maximum temperature of 150° and to re-establish the firing of the boiler when the temperature of the water delivered from the boiler falls to a temperature of 125° F. The aquastat 79, therefore, maintains the water delivered from the boiler within a prescribed temperature range, as defined by its high and low temperature settings. Another aquastat designated 80 is interposed in the return line 43 and is set preferably to function when the water being returned to the boiler reaches a temperature of 80°. Such temperature indication is sufficient to inform an attendant that the water, even though it be below the temperature of 150°, is sufficiently hot to adequately protect the number of buses being served at the several stations 10, 11 and 12.

Control circuits

The control circuits include main leads 81 and 82 and relays A, B, C and D. Assuming that the main switch E is closed and the temperature in the parking lot is above the functional setting of the thermostat 78, a circuit is closed through the solenoid coil 83 for actuating the relay A and thereby opening its lower and upper contacts 84 and 85. Inasmuch as the upper contact is interposed in the main lead 81, the opening of relay A de-energizes all control elements of the circuit. However, when the temperature at the parking lot falls below the temperature setting of said thermostat 78 a solenoid coil 83 is de-energized to permit the contacts 84 and 85 of relay A to close under the influence of spring 86. The closing of the lower contact 84 establishes an energizing circuit through motor 21 so as to start the operation of the circulating pump 22, the blower 23 and the fuel pump 27. This circuit leads from the main lead 81 through the closed contact 84 of relay 83 to the motor 21 and thence to the other main lead 82. The closing of the upper contact 85 of said relay A energizes the upper portion of the main lead 81 so as to energize the solenoid coil 87 of relay B and thereby open its contact 88. The solenoid coil 87, however, is such that it is ineffective to operate its relay contact 88 for a period of four seconds after its energizing circuit is closed. In other words, the relay contact 88 will be held closed by virtue of the spring 89 for a period of four seconds after the coil energizing circuit has been closed. This period of four seconds is sufficient to complete the energization of the solenoid coil 90 of relay C so as to open its lower contact 91 and close its upper contact 92 against the tension of spring 93. The circuit for energizing solenoid coil 90 includes one main lead 81, lead 94, relay contact 88, leads 95 and 96, solenoid coil 90 and lead 97 to the other side of the line. The closing of contact 92 of relay C establishes a circuit leading from main lead 81 through wire 98, upper contact 92 of relay C, wire 99, a closed thermal switch element 100 located in the smoke stack of the boiler, lead 101, push buttons 102, 103 and wire 104 to the aquastat switch 79 and thence through wire 105, solenoid coil 106 of relay D and wire 107 to the other side of the line. The energization of relay D opens its upper and lower contacts 108 and 109 and closes its middle contact 110. The opening of the upper contact 108 results in de-energizing and, therefore, opening the fuel valve 32 so that the fuel is delivered to the spray nozzle structure 31. The closing of contact 110 energizes the primary coil 111 of the transformer 37 so that an electrical arc is discharged from the spark plug 35 to ignite the fuel mixed with the combustion air in the combustion chamber of the boiler. The energizing circuit thus broken to open the valve 32 comprises the main lead 81, lead 112, upper contact 108 of relay D, lead 113, solenoid coil of valve 32 and thence through lead 114 to the other side of the line. The circuit for energizing the ignition mechanism includes lead 115 connected at one side of the line, the closed contact 110 of relay D, lead 116, primary coil 111 of the transformer 37 and lead 117 to the other side of the line.

Figure 6:
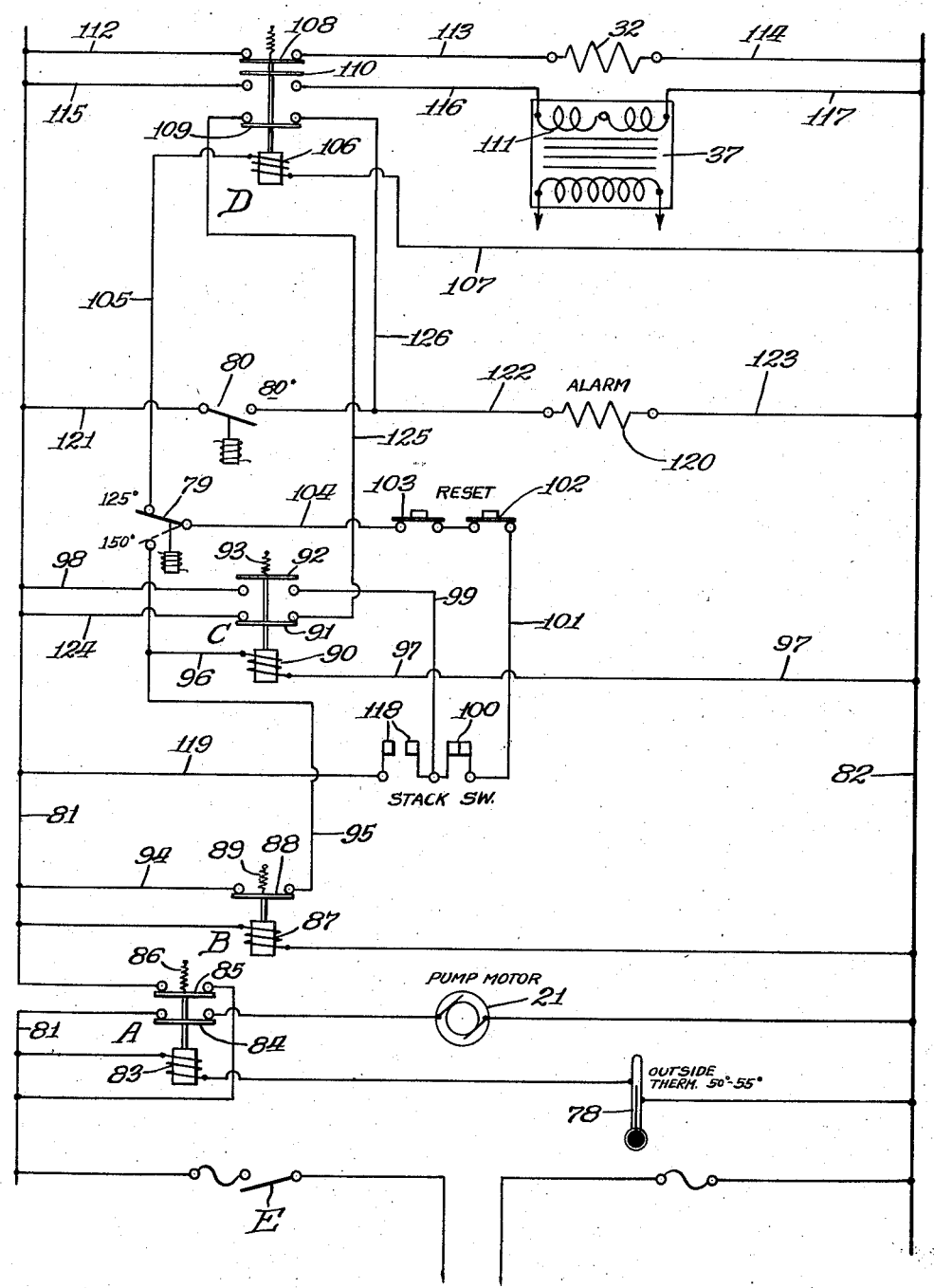
Fig. 6 is a diagrammatic view of the electrical wiring for controlling the operation of the heating apparatus.

The solenoid 90 of relay C is such that the relay C will remain energized only for forty-five seconds so as to complete the energization of relay D for a period of forty-five seconds. If the ignition has failed or if, for any reason, the stack temperature from the boiler has not risen sufficiently to close the stack switch contacts 118, the relay D will be de-energized and, therefore, close the contact 108 to energize the fuel valve 32 closed and to open the contact 110 to de-energize the ignition mechanism. However, assuming that the stack temperature from the boiler has increased sufficiently to close the stack switch contacts 118, a circuit is then closed from the main lead 81 through wire 119, closed stack switch contacts 118 and 100 to wire 101, push buttons 102, 103, wire 104 and aquastat switch 79, wire 105, coil 106 of relay D and wire 107 to the other side of the line so as to maintain the relay D energized. Consequently, the boiler will continue operation until the temperature of the water discharged therefrom reaches 150° F. At this time the aquastat switch 79 will move to the dotted line position in Fig. 6 so as to open the energizing circuit for relay D and thereby permit it to return to a position whereby the upper contact 108 is closed, the lower contact is closed and the middle contact is open. In such position the delivery of fuel to the boiler is shut off and also the spark mechanism is de-energized. However, the motor 21 for operating the pump 22, blower 23 and the fuel pump 27 continues, the fuel from the pump being by-passed through the relief valve 33 to the supply tank. As soon as the water cools to a temperature of 125° F. the aquastat switch 79 will resume its full line position, as shown in Fig. 6, so as to re-establish an energizing circuit through the solenoid coil 106 of relay D, thereby opening contact 108 to de-energize open the fuel valve 32 and close the contact 110 to re-energize the ignition mechanism.

If it is desired, for any reason, to stop the operation of the boiler, either one of the push buttons 102, 103 may be operated to open the energizing circuit for the relay D and thereby shut off the fire to the boiler. A plurality of push buttons are interposed in the circuit so that they may be positioned at convenient locations for operation by the parking lot attendant.

An aquastat switch designated 80 is positioned in the return duct 43 so as to be responsive to the temperature of the water returned to the boiler. When the temperature of the return water reaches the functional setting of the aquastat switch 80, for example 80° F., the switch is closed and thereby closes a circuit through an alarm 120. The energizing circuit for the alarm 120 includes leads 121, aquastat switch 80, lead 122, alarm 120, and lead 123 to the other side of the line. Consequently, when the temperature in the return line reaches 80°, the conditions are such as to make it desirable to stop the operation of the boiler whereupon the attendant can stop the operation by opening one of the push buttons 102, 103. An energizing circuit through the alarm 120 is also closed if, for any reason, the relay C becomes de-energized while the relay D is de-energized. This circuit leads from one side of the line through wire 124 through lower contact 91 of relay C, wire 125 through lower contact 109 of relay D, wire 126 to the junction with wire 122, thence through the alarm 120 and lead 123 to the other side of the line.

If the stack switch contacts 118 fail to close within the period of forty-five seconds after the closing of an energizing circuit through solenoid 90 of relay C or if, for any other reason, the energizing circuit is broken to interrupt operation of the boiler, except the normal opening of the aquastat switch 79, it is necessary, before starting operation of the boiler, to open the main switch E, thereby de-energizing the relay B so as to close its contact 88. Under this condition the reclosing of the main switch E will again close a circuit through the solenoid 90 of relay C before the solenoid 87 of switch B is fully energized to open its switch. The firing of the boiler, therefore, will continue for forty-five seconds during which time the stack switch contacts 118 will close so as to permit normal firing operations to resume. If the stack temperature rises above the temperature setting of the stack switch 109, for example 400° F., this switch will open so as to break the boiler control circuits and thereby result in energizing the alarm 120.

We claim:

1. A water heating and distributing system for supplying hot water to the water circulating systems of a plurality of motor vehicles, comprising in combination means for heating water, a delivery conduit leading from the water heater and communicating with the water circulating systems of a plurality of motor vehicles, a return conduit leading from the water circulating systems of the motor vehicles to the water heater, an electrically operated pump connected in one of said conduits for forcing the water through the water heater and through the water circulating system of said motor vehicles, and means responsive to the external temperature for controlling the operation of the said water heater and said pump.

2. A water heating and distributing system for supplying hot water to the water circulating systems of a plurality of motor vehicles, comprising in combination means for heating water, a delivery conduit leading from the water heater and communicating with the water circulating systems of a plurality of motor vehicles, a return conduit leading from the water circulating systems of the motor vehicles to the water heater, an electrically operated pump connected in one of said conduits for forcing the water through the water heater and through the water circulating system of said motor vehicles, means responsive to a predetermined external temperature for automatically starting and stopping the system as a whole, and means including a device responsive to a predetermined minimum temperature of the water being circulated and cooperating with the external temperature responsive means for activating the water heating means and responsive at a predetermined maximum temperature of the water being circulated to deactivate the water heater.

3. A water heating and distributing system for supplying hot water to the water circulating systems of a plurality of motor vehicles, comprising in combination means for heating water, a delivery conduit leading from the water heater and communicating wtih the water circulating systems of a plurality of motor vehicles, a return conduit leading from the water circulating systems of the motor vehicles to the water heater, an electrically operated pump connected in one of said conduits for forcing the water through the water heater and through the water circulating system of said motor vehicles, means responsive to a predetermined external temperature for automatically starting and stopping the system as a whole, and means including a device interposed in the water delivery conduit and responsive to a predetermined minimum temperature of the water being circulated and cooperating with the external temperature responsive means for activating the water heating means and responsive at a predetermined maximum temperature of the water being circulated to deactivate the water heater.

4. A water heating and distributing system for supplying hot water to the water circulating systems of a plurality of motor vehicles according to claim 3 characterized in that the said delivery and return ducts lead from the water heater to a distributing station provided with delivery and return manifold fittings, and a plurality of connections leading from the delivery manifold to the circulating systems of a plurality of motor vehicles, and a plurality of connections leading from the circulating systems of said motor vehicles to the return manifold fitting.

5. A water heating and distributing system for supplying hot water to the water circulating systems of a plurality of motor vehicles as defined in claim 4 in which the means for deactivating the water heater in response to the predetermined maximum temperature of the water being circulated is effective to deactivate the water heater without affecting the operation of the means for forcing the water through the delivery and return conduits so as to restrict the operation of the water heater in relation to the demand for hot water.

6. A water heating and distributing system for supplying hot water to the water circulating systems of a plurality of motor vehicles as defined in claim 4 characterized in that the delivery and return conduits are connected with a plurality of delivery and return manifold fittings, whereby hot water may be supplied to a plurality of groups of motor vehicles.

7. A water heating and distributing system for supplying hot water to the water circulating systems of a plurality of motor vehicles, comprising in combination means for heating the water, a delivery conduit leading from the water heater and communicating with the water circulating systems of a plurality of motor vehicles, a return conduit leading from the water circulating systems of the motor vehicles to the water heater, an electrically operated pump connected in one of said conduits for forcing the water through the water heater and through the water circulating systems of said motor vehicles, means responsive to a predetermined external temperature for automatically starting and stopping the system as a whole, and means including a device interposed in the water delivery conduit and responsive to a predetermined minimum temperature of the water being circulated and cooperating with the external temperature responsive means for activating the water heating means and responsive at a predetermined maximum temperature of the water being circulated to deactivate the water heater, and means responsive to the temperature of the water returning to the water heater and a signal device controlled thereby for giving a warning signal when the return water rises to a predetermined maximum temperature.

8. A water heating and distributing system for supplying hot water to the water circulating system of a motor vehicle, comprising in combination a boiler, means including an electric motor vehicle adapted to force water through the boiler for heating the water, a thermal switch located in the smoke stack of the boiler, and a second switch connected in series with said thermal switch for feeding current to said motor.

9. A water heating and distributing system for supplying hot water to the water circulating system of a motor vehicle as specified in claim 8, in which said second switch is in the form of a push button, and in which said second switch is effective for controlling the operation of the motor when said thermal switch is in closed condition.

10. A water heating and distributing system for supplying hot water to the water circulating system of a motor vehicle as specified in claim 9, in which the closure of said thermal switch by the influence of the heat in the smoke stack serves to condition the circuit comprising the thermal switch and said second switch so that said second switch is adapted by cooperative action to control the operation of said motor so long as said thermal switch remains closed.

11. A water heating and distributing system for supplying hot water to the water circulating system of a motor vehicle as specified in claim 8, in which said thermal switch is adapted to open when the temperature at the switch rises to about 400 degrees F.

12. A water heating and distributing system for supplying hot water to the water circulating system of a motor vehicle as specified in claim 9 to supply heat to a motor vehicle under cold weather conditions, comprising in combination a boiler, means including an electric motor adapted to force water through the boiler for heating the water, and a thermal switch located in the smoke stack of the boiler and connected with said motor so as to automatically deactivate said motor and said boiler when the temperature in said smoke stack rises above a predetermined level.

13. A water heating and distributing system for supplying hot water to the water circulating system of a motor vehicle as specified in claim 9 to supply heat to a motor vehicle under cold weather conditions, comprising in combination means for producing hot water under pressure, and flexible hose members for feeding hot water from said producing means to an inlet fitting for the water circulating system of a motor vehicle and for returning water to said producing means from an outlet fitting of said water circulating system.

14. In a water heating and distributing system for supplying hot water to a plurality of motor vehicles under cold weather conditions, the combination of means for producing hot water, comprising a boiler, a line of piping carrying hot water from the boiler, a plurality of flexible hose members for feeding water from said line of piping to inlet fittings for the water circulating systems of a plurality of motor vehicles, a second line of piping for returning water to the boiler, and a plurality of flexible hose members for feeding water to said second line of piping from the water circulating systems of said vehicles.

15. In a water heating and distributing system for supplying hot water to a motor vehicle under cold weather conditions, the combination of means for producing hot water under pressure, a plurality of pairs of flexible hose members connected with said producing means for feeding hot water from said producing means to inlet fittings on the radiators and the body heating mechanisms of a group of motor vehicles and for returning water to said producing means from outlet fittings on said radiators and said body heating mechanisms, lines of piping connected with said hot water producing means for conducting hot water therefrom to a second point for distribution, a housing about the end portions of said lines of piping, and a plurality of pairs of flexible hose members connected with said lines of piping within said housing for feeding hot water from one of said lines of piping to inlet fittings on the radiators and the body heating mechanisms of a second group of motor vehicles and for returning water to the other of said lines of piping from outlet fittings on the radiators and body heating mechanisms of said second group of motor vehicles.

EDWARD A. RUSSELL.
NORMAN O. KIRKBY.

References Cited in the file of this patent

UNITED STATES PATENTS

| Number | Name | Date |
| --- | --- | --- |
| 1,783,289 | Hopkins | Dec. 2, 1930 |
| 1,885,225 | Bordeaux | Nov. 1, 1932 |
| 1,939,376 | Van Vulpen | Dec. 12, 1933 |
| 2,078,116 | Arndt | Apr. 20, 1937 |
| 2,121,090 | Kuehn | June 21, 1938 |
| 2,414,214 | Spackman | Jan. 14, 1947 |

FOREIGN PATENTS

| Number | Country | Date |
| --- | --- | --- |
| 174,243 | Great Britain | Jan. 26, 1922 |
| 296,043 | Great Britain | Aug. 24, 1928 |
| 900,944 | France | Oct. 23, 1944 |
| 110,466 | Sweden | Dec. 25, 1944 |